(12) United States Patent
Jenkins

(10) Patent No.: US 6,669,479 B1
(45) Date of Patent: Dec. 30, 2003

(54) METHOD AND APPARATUS FOR IMPROVED VISUAL PRESENTATION OF OBJECTS FOR VISUAL PROCESSING

(75) Inventor: William Michael Jenkins, Pacifica, CA (US)

(73) Assignee: Scientific Learning Corporation, Oakland, CA (US)

(*) Notice: Subject to any disclaimer, the term of this patent is extended or adjusted under 35 U.S.C. 154(b) by 0 days.

(21) Appl. No.: 09/348,091

(22) Filed: Jul. 6, 1999

(51) Int. Cl.[7] ............................................. G09B 17/00
(52) U.S. Cl. ........................ 434/178; 434/156; 434/167
(58) Field of Search ................................ 434/157, 167, 434/170, 178, 156, 159, 161, 169, 173, 184, 185

(56) References Cited

U.S. PATENT DOCUMENTS

| | | | | |
|---|---|---|---|---|
| 4,121,357 A | * | 10/1978 | Hoffman | 434/178 |
| 4,636,173 A | * | 1/1987 | Mossman | 434/178 |
| 4,889,422 A | | 12/1989 | Pavlidis | 351/210 |
| 4,997,374 A | * | 3/1991 | Simone | 434/317 |
| 5,286,205 A | * | 2/1994 | Inouye | 434/157 |
| 5,387,104 A | | 2/1995 | Corder | 434/156 |
| 5,451,163 A | * | 9/1995 | Black | 434/178 |
| 5,538,430 A | * | 7/1996 | Smith | 434/178 |
| 5,813,862 A | | 9/1998 | Merzenich | 434/185 |
| 6,019,607 A | | 2/2000 | Jenkins et al. | 434/116 |

OTHER PUBLICATIONS

Fast ForWord ™, Internet– http://www.scientificlearning.com (Downloaded Aug. 11, 1998).
CD–ROM entitled: Away we go! Bookshelf™, © 1999 Scientifiic Learning.
CD–ROM entitled: Imo & the King™, © 1995 Capitol Multimedia, Inc.

* cited by examiner

*Primary Examiner*—Kurt Fernstrom
(74) *Attorney, Agent, or Firm*—Beyer Weaver & Thomas LLP

(57) ABSTRACT

A method and apparatus is disclosed that includes techniques for modifying visual information to improve the visual processing of a target object by a human subject in conjunction with the presentation of auditory information related to the target object. The techniques may include visual modification to the target object. In addition, the techniques also may include reducing the visual processing load produced by competing information or other objects unrelated to the visual processing of the target object. The techniques are well suited for application with the presentation of visual information directed to reading, speech reception and speech production instruction.

9 Claims, 5 Drawing Sheets

The orange bicycle
~302  ~304  ~306
308
~310
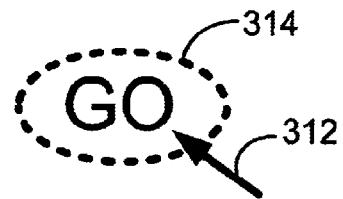
FIG. 3A
The orange bicycle
~302  ~304  ~306
FIG. 3B
The orange bicycle
~302  ~304  ~306
FIG. 3C
The orange bicycle
~302  ~304  ~306
FIG. 3D The orange bicycle
302  304  402  306

METHOD AND APPARATUS FOR IMPROVED VISUAL PRESENTATION OF OBJECTS FOR VISUAL PROCESSING

BACKGROUND OF THE INVENTION

The present invention relates generally to the modification of visual information. More particularly, the present invention relates to techniques for modifying visual information, presented in conjunction with auditory information, to enhance visual processing of a target object and learning to associate visual information presented with auditory information and vise versa for a human subject.

Visual processing of information plays an important role in human functioning. One particular example of the importance of visual processing is written speech. Recent studies have shown that specific language impaired and reading impaired (dyslexic) individuals have difficulty in recognizing and distinguishing written speech. These difficulties in processing typically result in a delayed and usually defective development of reading skills. In particular, for children with these reading and often-associated aural deficits, reading, speech reception and speech production instruction may continue throughout elementary and secondary schooling if the resources are available. The impairment can often lead to a truncation in education and may result in compromising the potential of the individual.

Studies have shown that these problems in reading and speech processing may be due to the inability of the receptive and cognitive powers of the brain to correctly identify the rapidly changing components of the visual and auditory input. By way of example, an individual may be unable to generate a reliable representation of the phonetic elements of the language in their brain. The result is that the individual has difficulty in correctly identifying the unique components of strings of written speech. In addition, the individual may have limited abilities in cognitively associating aural speech with the brain's poor representation of written speech.

To improve reading and speech processing abilities, new forms of treatment have become available. By way of example, computer-implemented reading training programs have become available to help children having an inability in the receptive and cognitive powers of the brain to correctly identify the rapidly changing components of the visual and auditory input. The computer-implemented training programs present orthographic representation (the symbolic representation of the sounds of language) along with matching auditory presentation at progressive levels of difficulty to strengthen reading, speech reception and speech production abilities. While being designed to elicit improvements in these areas, the programs have not been designed to be sensitive to visual processing, which may compromise effectiveness of the programs.

The visual processing system is responsible for reducing an excessive amount of information from the visual field to a level suitable for processing the relevant information by the brain. Four common information reduction mechanisms used in the visual processing system include shape/object detection, movement detection, edge detection and foreground/background separation. By way of example, when reading an orthographic representation, the visual processing system may focus on a particular area of the visual field (the foreground). More specifically, the orthographic representation may be a word, the foreground may be the page and the background everything in the visual field outside the foreground. Thus, the foreground/background separation allows relatively increased neuronal activity for an object in the foreground.

In the past, to bring attention to a particular orthographic representation in synchrony with simultaneous auditory presentation, a variety of methods have been implemented. FIG. 1A illustrates one conventional method of bringing attention to an orthographic representation 102 using a bounding box 104. The bounding box 104 is typically lit up in addition to changing (e.g., coloring) an area 106 within the edges of the bounding box 104. With respect to visual processing of the orthographic representation 102, the bounding box 104 is inefficient since it introduces a new visual object (the box) and information (the edges and corners of the box) unrelated to visual processing of the orthographic representation 102. Thus, the bounding box 104 is a distraction and represents unnecessary additional information to be processed. In addition, the nervous system may undesirably respond to the visual information of the bounding box 104 more than to the orthographic representation 102. As a result, the bounding box 104 is suitable for drawing attention to a particular portion of the visual field, but it is not favorable to facilitating the visual processing of the orthographic representation 102.

FIG. 1B illustrates another conventional method of bringing attention to the orthographic representation 102 using a bouncing ball 110. While sufficient in channeling attention to the general vacinity of the orthographic representation 102, the bouncing ball 110 introduces another visual stimulus to be processed. Again, the bouncing ball 110 results in neural stimulation unrelated to the visual processing of the orthographic representation 102 and thus is not suitable for facilitating the visual processing of the orthographic representation 102. In addition, as visual processing of movement carries significant processing load and may take priority over the processing of static information, this further compromises the visual processing of the orthographic representation 102.

While these methods have been suitable in drawing attention towards a particular area of the visual field, they have not been conducive to the visual processing of the orthographic representation 102. By way of example, from a learning perspective, as the individual may be required to associate the sound of the word with the orthographic representation of the word, these distractions may detract from the proper correlation and learning.

In addition to the active methods added to bring attention to the orthographic representation 102, there may be additional visual objects which detract from the visual processing of the target object. FIG. 1A also includes a picture 108 which is unrelated to the visual processing of the orthographic representation 102. Undesirably, the picture 108 may act as a visual processing distraction which may further compromise visual processing of the orthographic representation 102.

In view of the foregoing, improved techniques for modifying visual information to enhance visual processing for a human subject would be desirable.

SUMMARY OF THE INVENTION

The present invention relates to enhancing the visual processing of orthographic representations presented in conjunction with auditory information. In a preferred embodiment, the orthographic representations are words presented on a computer screen in conjunction with the auditory presentation of the words. Visual processing is enhanced by modifying each word on the screen as it is auditorally presented. This enhancement is achieved by increasing the contrast of the word relative to the background against which the words are presented without moving the edge locations of the letters of the word and without introducing any new edges. By modifying the orthographic representations or other visual information synchronously with their auditory presentation in this way, the attention of the viewer/listener is brought to the word without introducing other unwanted visual stimulation that could distract attention from the word. It is believed that this results in optimized visual processing.

The invention is also generally directed to additional techniques for enhancing visual processing or salience of orthographic representations or other visual information presented in conjunction with auditory information. These include removing potentially distracting extraneous visual information, and making other changes to the orthographic representations of auditorally presented information to enhance visual processing. The techniques of the present invention have a wide range of applications in learning and training functions.

In one aspect, the invention relates to a computer-implemented method for presenting visual information upon a visual field for a human subject in conjunction with the presentation of auditory information. The method includes synchronously presenting the auditory information to be processed by the human subject. The method also includes presenting the visual information corresponding to the auditory information to be processed by the human subject, wherein the visual information is adapted to substantially facilitate visual processing of the visual information.

The invention relates, in another aspect, to a computer-implemented method for presenting visual information upon a visual field for a human subject in conjunction with the presentation of auditory information. The method includes presenting the auditory information to be processed by the human subject. The method also includes presenting the visual information corresponding to the auditory information to be processed by the human subject, wherein the visual information is modified to substantially improve the salience of the neuronal representation associated with the visual information.

The invention relates, in yet another aspect, to a computer readable medium including instructions for presenting an orthographic representation upon a computer screen for a human subject in conjunction with the presentation of auditory information related to the orthographic representation. The computer readable medium includes instructions for presenting the auditory information to be processed by the human subject. The computer readable medium also includes instructions for presenting the orthographic representation corresponding to the auditory information to be processed by the human subject. The method further includes modifying the orthographic representation to substantially improve the salience of the neuronal representation associated with the orthographic representation.

The invention relates, in a further aspect, to a computer-implemented method for delivering computer readable instructions for presenting visual information upon a visual field for a human subject in conjunction with the presentation of auditory information. The method includes transmitting, over a signal transmission medium, signals representative of instructions for presenting the auditory information to be processed by the human subject. The method also includes transmitting, over a signal transmission medium, signals representative of instructions for presenting the visual information corresponding to the auditory information to be processed by the human subject, wherein the visual information is adapted to substantially facilitate visual processing of the visual information.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings in which like reference numbers refer to like items and in which:

FIGS. 3B–3D illustrate, upon initiation of an auditory presentation, the visual modification of orthographic representations in synchrony with the auditory presentation to facilitate visual processing in accordance with one embodiment of the present invention.

DETAILED DESCRIPTION OF THE PREFERRED EMBODIMENTS

Figure 1A:
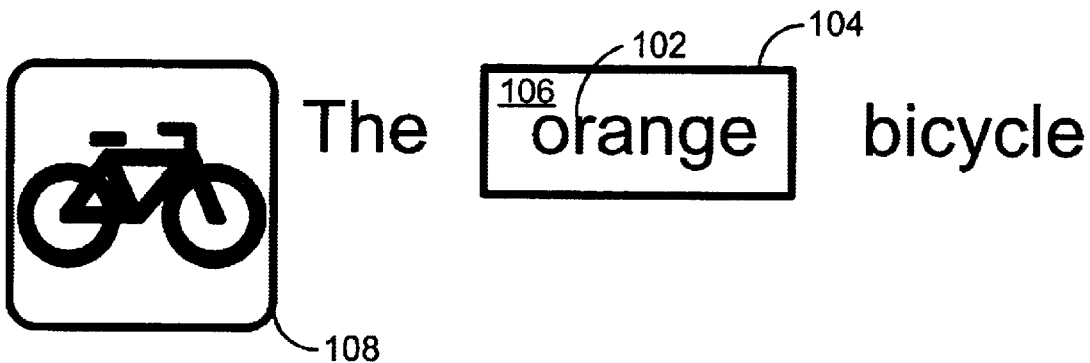
FIG. 1A illustrates one conventional method of bringing attention to an orthographic representation using a bounding box.
Figure 1B:
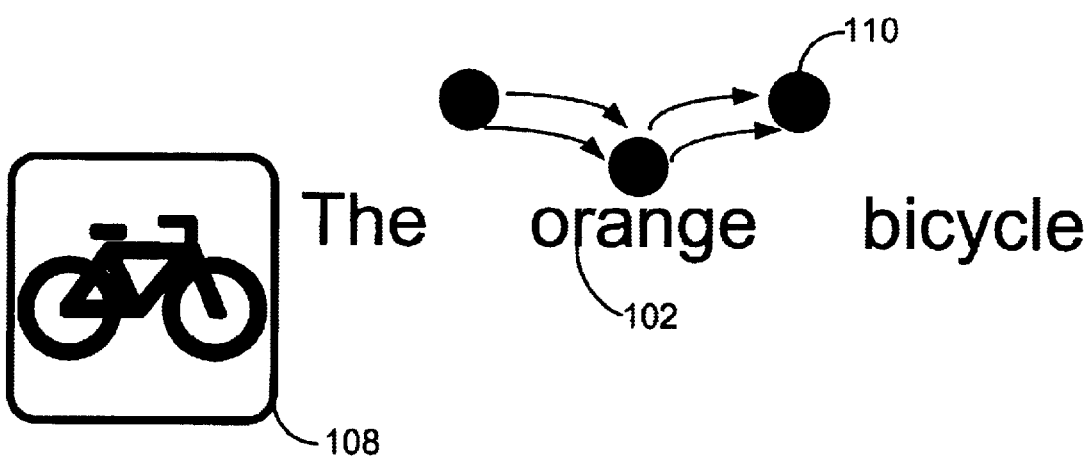
FIG. 1B illustrates another conventional method of bringing attention to the orthographic representation using a bouncing ball.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The present invention relates to enhancing the visual processing of orthographic representations presented in conjunction with auditory information. In a preferred embodiment, the orthographic representations are words presented on a computer screen in conjunction with the auditory presentation of the words. Visual processing is enhanced by modifying each word on the screen as it is auditorally presented. This enhancement is achieved by increasing the contrast of the word relative to the background against which the words are presented without moving the edge locations of the letters of the word and without introducing any new edges. By modifying the orthographic representations or other visual information synchronously with their auditory presentation in this way, the attention of the viewer/listener is brought to the word without introducing other unwanted visual stimulation that could distract attention from the word. It is believed that this results in optimized visual processing.

The invention is also generally directed to additional techniques for enhancing visual processing or salience of orthographic representations or other visual information presented in conjunction with auditory information. These include removing potentially distracting extraneous visual information, and making other changes to the orthographic representations of auditorally presented information to enhance visual processing. The techniques of the present invention have a wide range of applications in learning and training functions.

Salience of a sensory input neuronal representation in the brain refers to the quality and fidelity of the neuronal representation. A more salient neuronal representation is one which is sharper, clearer or of higher fidelity. It is well understood that when a sensory input neuronal representation is more salient, processing in the brain tends to be advanced. This advanced processing may lead to improved decision making ability and shorter decision, response and/or reaction times and more rapid learning. To improve the salience of a sensory input neuronal representation corresponding to a target object to be visually processed, and thereby facilitate visual processing, the target object may be visually modified. Thus, in accordance with one embodiment of the present invention, the target object is altered to facilitate visual processing.

The visual altering, modification and enhancement of the target object may be accomplished by altering any of the temporal or intensity parameters associated with the target object. Broadly speaking, the altering of the target object may be in any such manner that it results in neuronal activity which facilitates visual processing of the target object. By way of example, the edge contrast of the visual object relative to the background may be altered such that it produces an improved visual input neuronal representation. In one embodiment, the target object is visually altered such that a percept is registered by the subject. A percept is detection by the subject of the change. Preferably, the modification is directed to bring attention to the target object to facilitate visual processing of the information without introducing other unwanted visual stimulation that would distract attention from the intended visual target. By way of example, the color of the target object may be manipulated in a manner to facilitate improved visual processing as well as elicit a high level of attention from the human subject.

In accordance with another embodiment, objects in the visual field unrelated to visual processing of the target object are manipulated to improve the salience of sensory input neuronal representation corresponding to the target object. Broadly speaking, as visual distractions may be thought of as noise for the neuronal representation of the target object, the present invention may be directed to increasing the salience of the neuronal representation of the target object by reducing visual input that is unrelated to visual processing the target object. More specifically, objects in the visual field may be altered such that the visual processing system is not substantially engaged by stimulus unrelated to the target object. By way of example, unrelated visual information may be temporarily removed to facilitate visual processing of the target object.

As the visual modification of the target object may be in conjunction with the presentation of auditory information related to the target object, the visual modification may be sensitive to the auditory presentation. By way of example, the duration of the visual modification of the target object may be relative to an individual's temporal auditory processing of the auditory information. In another embodiment of the invention, altering of visual information is directed to present an improved learning environment for an individual based on simultaneous presentation of auditory and visual information. In particular, the auditory and visual information is presented in a manner to enhance the learning of sound and letter correspondence in a speech reception training program. Alternatively, the visual information may be adapted sensitive to auditory processing enhancement techniques as described in U.S. Pat. No. 5,089,149 which is herein incorporated by reference.

In accordance with one embodiment of the present invention, the visual enhancement techniques are used to improve reading, speech reception and speech production instruction. While not wishing to be bound by theory, it is believed that improved presentation of visual stimuli in conjunction with auditory presentation of the same stimulus provides an improved training signal to the brain. As it is well understood that an individual learns of sound-letter correspondence through the association of the sounds of speech with the orthographic representation of the speech, improved visual orthographic representation may result in improved visual neuronal representation, further leading to improved associations and learning. As a result of this improved learning environment from the individually improved presentation of visual stimuli in conjunction with auditory presentation, the brain may then more easily associate between the two forms of the stimulus on a continual basis to substantially facilitate reading instruction.

The features and advantages of these aspects of the invention, as well as other aspects of the present invention, may be better understood with reference to the figures and discussions that follow. In general, the visual manipulation techniques may be generated and administered using computer-implemented methods.

Figure 2:
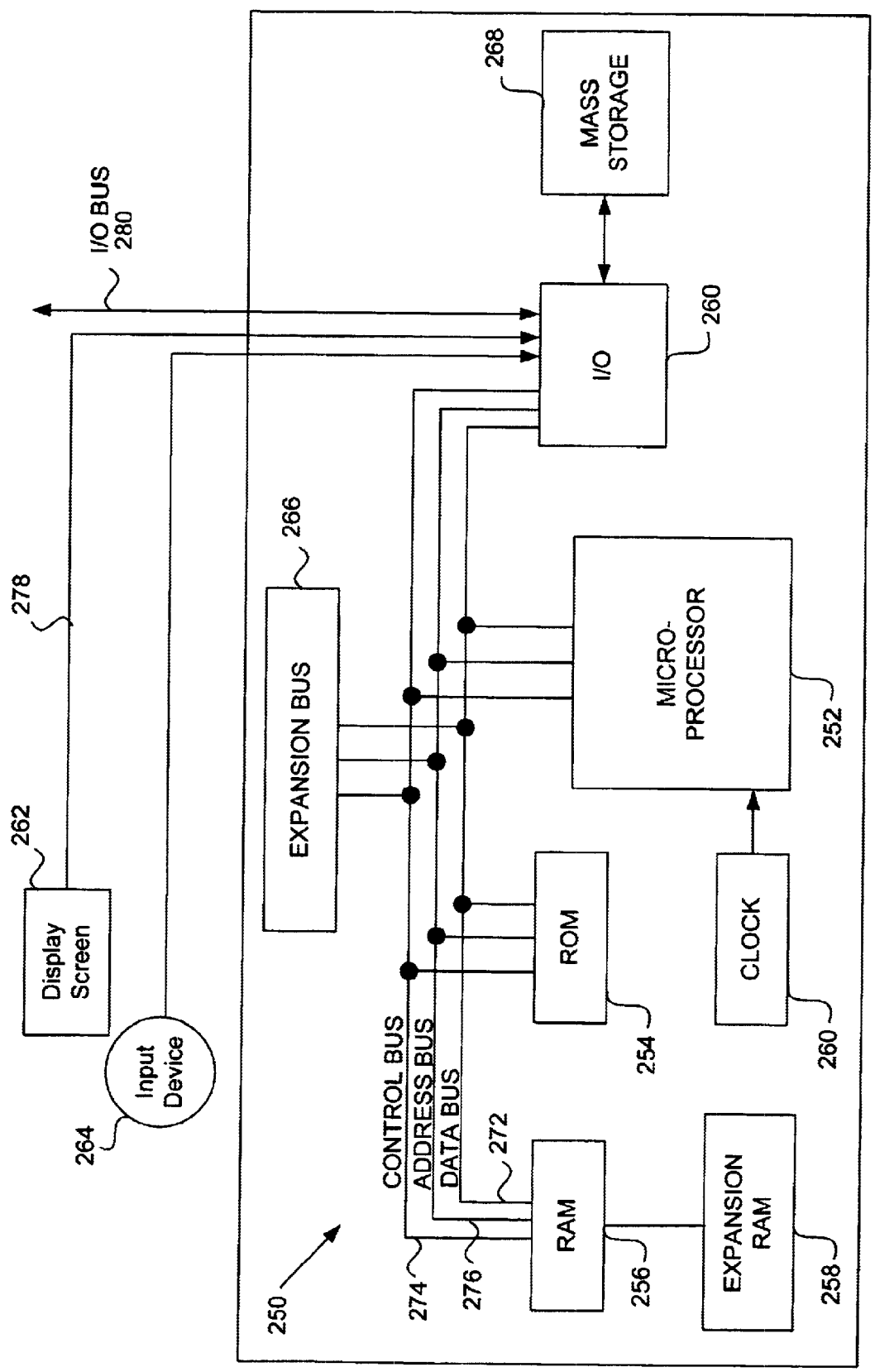
FIG. 2 shows a general purpose computer system, representing a computer suitable for implementing the present visual processing enhancement methods.

FIG. 2 shows a general-purpose computer system, representing a computer suitable for implementing the present inventive visual processing enhancement method. Referring to FIG. 2, a computer system 250 in accordance with the present invention includes a central processing unit (CPU) 252, read only memory (ROM) 254, random access memory (RAM) 256, expansion RAM 258, input/output (I/O) circuitry 260, display assembly 262, input device 264, and expansion bus 266. Computer system 250 may also optionally include a mass storage unit 268 such as a disk drive unit or nonvolatile memory such as flash memory and a real-time clock 260. In one embodiment, mass storage unit 268 may include units which utilize removable computer readable media, such as floppy disks, opto-magnetic media, optical media, and the like for the storage of programs and data.

CPU 252 is preferably a commercially available, single chip microprocessor such as one of the Intel X86 or Pentium™ or Motorola 680XX family of chips, a reduced instruction set computer (RISC) chip such as the PowerPC™ microprocessor available from Motorola, Inc, or any other suitable processor. CPU 252 is coupled to ROM 254 by a data bus 272, control bus 274, and address bus 276. ROM 254 may partially contain the basic operating system for the computer system 250. CPU 252 is also connected to RAM 256 by busses 272, 274, and 276 to permit the use of RAM 256 as scratch pad memory. Expansion RAM 258 is optionally coupled to RAM 256 for use by CPU 252. CPU 252 is also coupled to the I/O circuitry 260 by data bus 272, control bus 274, and address bus 276 to permit data transfers with peripheral devices.

I/O circuitry 260 typically includes a number of latches, registers and direct memory access (DMA) controllers. The purpose of I/O circuitry 260 is to provide an interface between CPU 252 and such peripheral devices as display assembly 262, input device 264, mass storage 268, headphone 280, speaker 282, and/or any other I/O device. Display assembly 262 of computer system 250 is an output device for displaying objects and other visual representations of data.

The screen for display assembly 262 can be a device that uses a cathode-ray tube (CRT), liquid crystal display (LCD), or the like, of the types commercially available from a variety of manufacturers. Input device 264 can be a keyboard, a mouse, a stylus working in cooperation with a position-sensing display, or the like. Alternatively, input device 264 can be an embedded RF digitizer activated by an "active" RF stylus. As a further alternative, input device 264 may be any type of switches capable of communicating a user response to computer system 250. Therefore, as used herein, the term input device will refer to any mechanism or device for entering data and/or pointing to a particular location on a screen of a computer display. The aforementioned input devices are available from a variety of vendors and are well known in the art.

Some type of mass storage 268 is generally considered desirable. However, mass storage 268 can be eliminated by providing a sufficient amount of RAM 256 and expansion RAM 258 to store user application programs and data. In that case, RAMs 256 and 258 can optionally be provided with a backup battery to prevent the loss of data even when computer system 250 is turned off. However, it is generally desirable to have some type of long term mass storage 268 such as a commercially available hard disk drive, nonvolatile memory such as flash memory, battery backed RAM, PC-data cards, or the like.

In operation, computer system 250 is employed to generate stimuli of the various cognitive tests. These stimuli may be furnished to the test subject using any of the output devices, including display assembly 262, headphone 280, speaker 282, or any other output device. Responses from the user may then be recorded by input device 264 and analyzed by CPU 252. If desired, feedback to the user may be given at various stages of the test(s) via display assembly 262, headphone 280 or speaker 282.

It should be borne in mind that although computer system 250 is discussed in detail herein to facilitate discussion, the inventive visual modification techniques may be practiced on a variety of suitable computer systems. By way of example, the inventive remote cognitive testing technique disclosed herein may be implemented via a computer network, such as a local area network (LAN), wide area network (WAN) or a global computer network such as the Internet. In the latter case, the inventive remote cognitive testing technique may be implemented as downloadable computer software and data (e.g., applets). The downloadable computer software and data may be kept on one or more servers on the network, accessible by any client computer or terminal capable and authorized for such access. To facilitate testing, the downloadable computer software and data can be downloaded once and reused over and over at the client computer/terminal. Alternatively, the downloadable computer software and data can be downloaded for each individual testing session via the network as needed. Network computing techniques and implementations are well known in the art and therefor are not discussed in great detail here for brevity's sake.

FIG. 3A illustrates a set of orthographic representations 302, 304 and 306 to be visually processed by a human subject in accordance with a preferred embodiment of the invention. The orthographic representations 302, 304 and 306 are included in a visual field 308. The visual field 308 represents the space or area viewed by the human subject. For example, the visual field 308 may be a portion of an image on a computer screen used in a reading skills training program. Collectively, the orthographic representations 302, 304 and 306 may be part of a sentence and story used in the reading skills training program. The visual field 308 may include other objects and pictures which are implemented in the reading skills training program. For example, the visual field 308 includes a bicycle picture 310 corresponding to the image implied by the orthographic representations 302, 304 and 306.

The visual field 308 also includes a pointer 312 and a manipulanda 314. The pointer 312 is a graphical user interface (GUI) object which provides visual positional user feedback, from the computer to the human subject, for a mouse or other similar stylus. The manipulanda 314 is another GUI object which allows the human subject to initiate the presentation of the auditory information. By way of example, the pointer 312, upon interaction with the manipulanda 314, may initiate the presentation of the auditory information. In addition, this interaction may also initiate visual modifications to any of the objects in the visual field 308 to enhance visual processing of any of the orthographic representations 302, 304 and 306. Thus, through use of the manipulanda 314, the human subject is flexibly permitted to initiate the auditory presentation of the orthographic representations 302, 304 and 306 and repeat the presentation if necessary.

As illustrated in FIGS. 3B–3D, upon initiation of the auditory presentation, the orthographic representations 302, 304 and 306 are, in turn, auditorally presented in synchrony with visual modifications to facilitate visual processing of each orthographic representation. In addition, as illustrated in FIGS. 3B–3D, upon initiation of the auditory presentation, the bicycle picture 310, the pointer 312 and the manipulanda 314 disappear to remove visual objects unrelated to the visual processing of the orthographic representations 302, 304 and 306 during their respective auditory presentation.

As illustrated in FIG. 3B, upon initiation of the auditory presentation, the orthographic representation 302 is visually modified in synchrony with its auditory presentation. The visual modification for the orthographic representation 302 includes increasing the contrast of the letters without changing their edge locations and without introducing a new edge to provide a more salient neuronal representation of the word.

As illustrated in FIG. 3C, upon subsequent presentation of the auditory information corresponding to the orthographic representation 302 (e.g., after the previous word has been presented through headphones), the orthographic representation 304 is visually modified in synchrony with its auditory presentation. The visual modification for the orthographic representation 304 includes increasing the contrast of the letters without changing their edge locations and without introducing a new edge to provide a more salient neuronal representation of the word. In addition, the visual modification for the orthographic representation 304 may include changing the color of the letters. By way of example, the letters may change from orange to black. It should also be noted that upon completion of the auditory presentation of the orthographic representation 302, the visual modification for the orthographic representation 302 presented in FIG. 3A terminates and the word visually reverts back to its pre-auditory presentation form.

As illustrated in FIG. 3D, upon subsequent presentation of the auditory information corresponding to the orthographic representation 304, the orthographic representation 306 is visually modified in synchrony with its auditory presentation. The visual modification for the orthographic representation 306 includes increasing the contrast of the letters without changing their edge locations to provide a more salient neuronal representation of the word. Similar to FIG. 3C, upon completion of the auditory presentation of the orthographic representation 304, the visual modification for the orthographic representation 304 presented in FIG. 3B is terminated and the word reverts back to its pre-auditory presentation form.

Figures 4A, 4B:
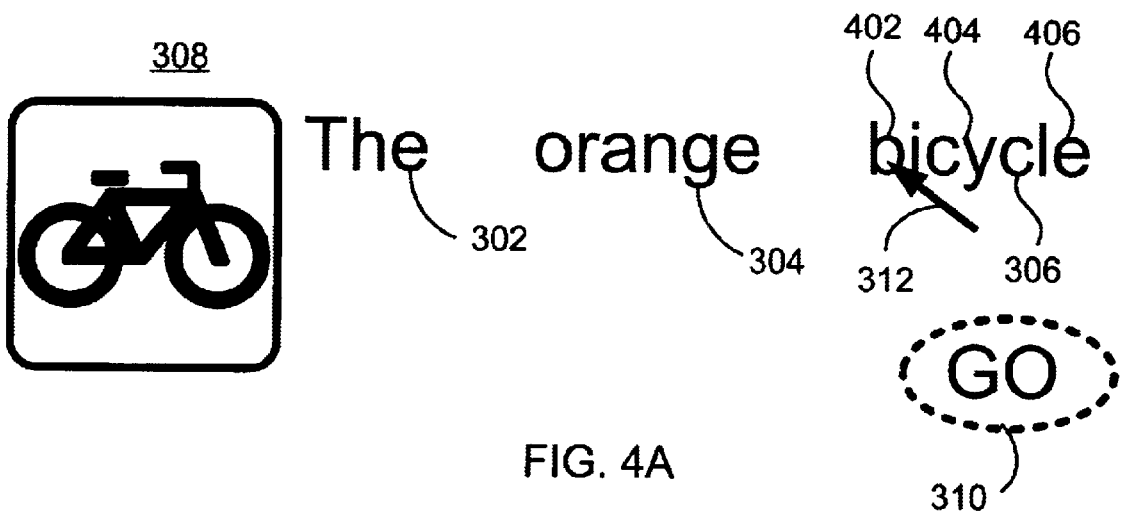
FIGS. 4A–4B illustrate the orthographic representations further divided into syllabic components and the use of a pointer to initiate the presentation of the auditory information and visual modifications of the syllabic components in accordance with one embodiment of the present invention.
Figure 5A:
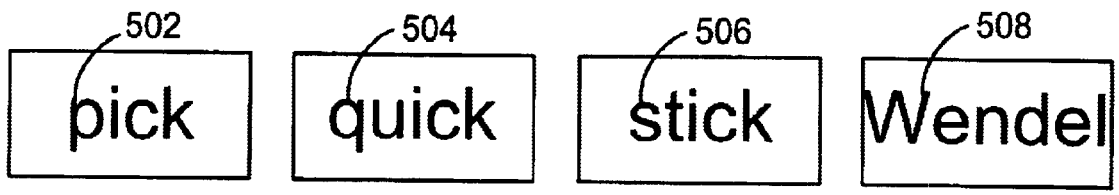
FIGS. 5A–5E illustrate the inventive visual modification techniques implemented in a recognition test used in phonological awareness training in accordance with one embodiment of the present invention.
Figure 5B:
Figure 5C:
Figure 5D:
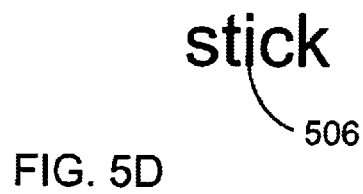
Figure 5E:

In another embodiment illustrated in FIG. 4A, the orthographic representations take the form of syllabic components. By way of example, the orthographic representation 306 is further divided into orthographic representations 402, 404 and 406.

FIG. 4A also illustrates another exemplary design alternative for the initiation of auditory presentation and visual modifications. In this case, the pointer 312 may initiate the presentation of the auditory information and visual modifications to any of the orthographic representations 402, 404 and 406, by interaction with their respective GUI components. Thus, through use of the pointer 312, the human subject is flexibly permitted to initiate the auditory presentation of individual orthographic representations 402, 404 and 406, and repeat the process as desired.

As illustrated in FIG. 4B, upon initiation of the auditory presentation, the orthographic representation 402 is visually modified in synchrony with the auditory presentation. The visual modification for the orthographic representations 402 includes increasing the contrast of the letters without changing their edge locations and without introducing a new edge to provide a more salient neuronal representation of the syllable. Similar to the previous case, the picture 310, the pointer 312 and the manipulanda 314 disappear to remove visual objects unrelated to the visual processing of the orthographic representation 402.

For the orthographic representations of FIGS. 3A–D and 4A–B, the modification of visual information may be in any manner such that it results in neuronal activity which facilitates visual processing of the target object, i.e. the current orthographic representation being auditorally presented. In one embodiment, the target object may be highlighted without changing edge locations in synchrony with the auditory presentation of the text. In another embodiment, the contrast of the visual text is increased relative to the background to facilitate improved correspondence between the visual processing and the auditory processing. More specifically, the increase in contrast may occur as a result of changing the gray scale values of the orthographic representation. Preferably, when the contrast of the text presentation is changed, the background is kept constant. Advantageously, this increased contrast may facilitate improved edge detection and visual processing of the text.

Alternatively, the color of the orthographic representation may be altered to improve visual processing. The change in color may be relative to the previous color of the orthographic representation, surrounding words, the background, etc. In addition, the colors may be altered relative to the processing abilities of a human subject. Correspondingly, when the visual representation is processed, a different set of neurons will be engaged, i.e. to promote recognition of the target object. By way of example, for a relatively white background, the color of a visual orthographic representation may change from yellow to purple to enhance contrast and neuronal stimulation.

Having briefly illustrated some specific embodiments of the present invention, some of the above mentioned features will now be expanded upon to illustrate some of the broad aspects of the present invention.

As mentioned above, in addition to increasing the salience of the neuronal representation by manipulating the target object to be processed, the present invention also includes reducing the amount of visual information unrelated to the target object. By way of example, GUI objects may disappear during the auditory presentation of the stimulus. After the stimulus has been delivered, the GUI objects may return. Obviously, the timing of the delivery of the stimulus and reappearance of objects removed to facilitate clarity in processing may be varied according to the application. In another attempt to decrease visual distractions during the auditory presentation of stimuli, any moving stimuli unrelated to the target object are preferably removed or at a minimum stopped.

In addition to the above methods of facilitating the visual processing of the orthographic representations 302, 304 and 306, modifications may be done on a temporal or illuminocity basis. For modification on a temporal basis, the time scale manipulation of visual information may be matched to the time scale presentation of auditory information corresponding to the visual information. In one particular embodiment, visual modification is performed on words one at a time as they are auditorally read. Alternatively, the visual modification may be performed non-simultaneously with the auditory presentation of the information. By way of example, a time delay between auditory presentation of an orthographic representation and its corresponding visual modification or presentation may be used in a training program to provide an individual having an auditory processing impairment added time to process the auditory input. As training proceeds and the auditory processing impairment improves, the time delay may be diminished. For modification on a illuminocity basis, as visual processing may be sensitive to illuminocity, the present invention also applies to modification of visual information to enhance visual processing by modification on a illuminocity basis.

Having briefly explained the nature of the modification of visual information, the nature of the nature of visual modification in the visual field, and the preferable changes to visual information to be processed, some examples of applications for which the present invention is suitable will now be described.

In a specific embodiment, the present invention is suitable for use with entertainment material including commercially available "Books on Tape" and video games, in particular interactive CD-ROMS that are rich in speech content. In these applications, the present invention is used to enhance verbal and pictorial material presented with or without synchronous auditory presentation.

In other embodiments, the modifications of FIGS. 3A–3D and 4A–4B may be directed to enhance the learning of sound and letter correspondence, or the auditory and visual information may be presented in a manner to present an optimum learning environment for an individual based on simultaneous presentation of auditory and visual information. Preferably, in order to facilitate the optimum learning environment for an individual based on simultaneous presentation of auditory and visual information, the only visual modifications are those relevant to the visual processing of the target object as the information is presented auditorally.

Ideally, the modifications produce a maximized physiological response to the visual information.

In another embodiment, the present invention is suitable for application to enhance the training of individuals with speech and language-based learning disabilities due to auditory and visual processing abnormalities in order to improve their speech reception, speech production, language comprehension, and reading abilities. More specifically, the present invention is suitable to help individuals with language and speech based disabilities to overcome their processing deficits so that they can recognize basic speech elements and normal elements of speech with higher accuracy, faster speed and greater intelligibility. Alternatively, the present invention is suitable to help normal individuals in the improvement of their language and reading processing capabilities. It is important to note that these improvements may be for either the subject's native language, or for a foreign language.

In a specific embodiment of the present invention, the visual enhancing techniques are implemented to facilitate the recognition of phenomes and connected speech in individuals with language-based learning disabilities. For example, the present invention is suitable for application in Away We Go Bookshelf™ which is a language training product for children supplied by Scientific Learning Corporation of Berkeley, Calif.

In one embodiment, the improved visual presentation techniques are suitable for use with programs used in the language and reading development in children. By way of example, the present invention is suitable for use with a computer implemented training tool such as FastForward® as supplied by Scientific Learning of Berkeley Calif. The above mentioned FastForward® program is described in U.S. Pat. No. 5,813,862 which is herein incorporated by reference.

Broadly speaking, the present invention is suitable for any training, assessment and testing software and apparatus implementing processing of auditory and visual information. Correspondingly, the present invention is suitable for use in a wide variety of computer-implemented approaches to learning, remediating or training a particular issue. The learning or training may be directed to natural developmental stages of learning, a learning deficit, cognitive deficit, a health abnormality, rehabilitative treatment, etc. By way of example, the present invention may be implemented in therapy programs to remediate Schizophrenia as described in U.S. Pat. No. 5,134,759 which is herein incorporated by reference.

For the language instruction embodiments, the target object typically takes the form of an orthographic representation. The orthographic representation may include, but is not limited to, any word, letter, syllable, printed text, phonetic construction or phenome. Broadly speaking, the orthographic representation may be any symbolic representation of the sounds of language by letters or characters.

As shown in FIG. 5, the inventive techniques may be implemented in a recognition test used in phonological awareness training in accordance with one embodiment of the present invention. In the recognition test, four test stimuli 502, 504, 506 and 508 are presented to the subject. As illustrated in FIGS. 5B–5E, as the test stimuli 502, 504, 506 and 508 are auditorally presented in turn, each is visually modified in accordance with the above techniques. Upon completion of the individual presentation of the test stimuli 502, 504, 506 and 508, the testing may return to the status illustrated in FIG. 5A. To complete the recognition test, the human subject in this case must select the phonetically different stimulus. The correct selection for the recognition test of FIG. 5 is the test stimulus 508.

In one embodiment, the presentation of auditory information in conjunction with a suitable visual representation that is isomorphic to what is heard may include musical information. Accordingly, the improved visual representation techniques may be used to improve associations between the auditory and visual processing of musical information. More specifically, the inventive visual enhancement techniques may be used to improve reading and auditory correlation of sheet music, musical reception and musical production. Thus, the subject may engage in computer-implemented learning exercises directed to improve the association of the auditory processing of musical notes and chords with the visual representation of the musical notes and chords. The computer-implemented learning exercises may also be used to train somatomotor musical ability by improving auditory and visual processing of musical information. More specifically, the present invention may be applied to instruction software directed to improving musical ability for a particular musical instrument. In this embodiment, in addition to the visual manipulation of sheet music, pictorial representations of the particular musical instrument may be displayed and modified in conjunction with auditory presentation. By way of example, as the fingering pattern for a B flat tone has a specific visual representation on a clarinet, the visual representation of the note may be enhanced by any of the inventive techniques described above in conjunction with the auditory presentation of a B flat tone from a clarinet.

Generally, the present invention discloses computer-implemented methods and apparatus including techniques for improving the visual processing of a target object in conjunction with the presentation of auditory information relating to the target object. By way of example, the proposed invention covers computer readable medium that includes instructions for altering objects to enhance visual processing as described above. Yet another example of the present invention is a system for delivering computer readable instructions, such as transmission, over a signal transmission medium, of signals representative of instructions for altering objects to enhance visual processing as described above.

While this invention has been described in terms of several preferred embodiments, there are alterations, permutations, and equivalents which fall within the scope of this invention. By way of example, the orthographic representations 302, 304 and 306 may be included in a sentence further including additional visual and auditory information which are not discussed for brevity sake. In addition, the contrast, illuminocity and intensity of the target object may be manipulated to improve visual processing as desired by an application. It is therefore intended that the following appended claims be interpreted as including all such alterations, permutations, and equivalents as fall within the true spirit and scope of the present invention.

What is claimed is:

1. A computer-implemented method for presenting an orthographic representation upon a computer screen for a human subject in conjunction with the presentation of auditory information related to the orthographic representation, the computer-implemented method comprising:

presenting the auditory information to be processed by the human subject;

presenting the orthographic representation corresponding to the auditory information to be processed by the human subject; and modifying the orthographic representation non-simultaneously with presenting the auditory information, wherein the non-simultaneous modification includes a time delay between presenting the auditory information and modifying the orthographic representation.

2. The method of claim 1 wherein presenting the orthographic representation is directed to improving one of reading instruction, speech reception instruction and speech production instruction.

3. The method of claim 1 further including modifying visual information unrelated to processing of the orthographic representation.

4. The method of claim 1 wherein non-simultaneous modification includes a time delay between presenting the auditory information and modifying the orthographic representation and the time delay changes as training proceeds in a training program.

5. The method of claim 4 wherein presenting the orthographic representation includes at least one letter from the English language alphabet.

6. The method of claim 1 wherein presenting the orthographic representation includes a word.

7. A computer readable medium including instructions for presenting an orthographic representation upon a computer screen for a human subject in conjunction with the presentation of auditory information related to the orthographic representation, the computer-implemented method comprising:

instructions for presenting the auditory information to be processed by the human subject;

instructions for presenting the orthographic representation corresponding to the auditory information to be processed by the human subject; and instructions for modifying the orthographic representation non-simultaneously with presenting the auditory information, wherein the non-simultaneous modification includes a time delay between presenting the auditory information and modifying the orthographic representation.

8. The computer readable medium of claim 7 further including instructions for improving one of reading instruction, speech reception instruction and speech production instruction.

9. A computer-implemented method for delivering computer readable instructions for presenting visual information upon a visual field for a human subject in conjunction with the presentation of auditory information, the method comprising:

transmitting, over a signal transmission medium, signals representative of instructions for presenting the auditory information to be processed by the human subject;

transmitting, over a signal transmission medium, signals representative of instructions for presenting the visual information corresponding to the auditory information to be processed by the human subject; and transmitting, over a signal transmission medium, signals representative of instructions for removing visual input in the visual field that is unrelated to processing of the visual information.

* * * * *